July 5, 1927.  P. J. McINERNEY  1,634,263

JOINT FORM

Filed June 9, 1925  2 Sheets-Sheet 1

Peter J. McInerney
INVENTOR

July 5, 1927.
P. J. McINERNEY
1,634,263
JOINT FORM
Filed June 9, 1925
2 Sheets-Sheet 2
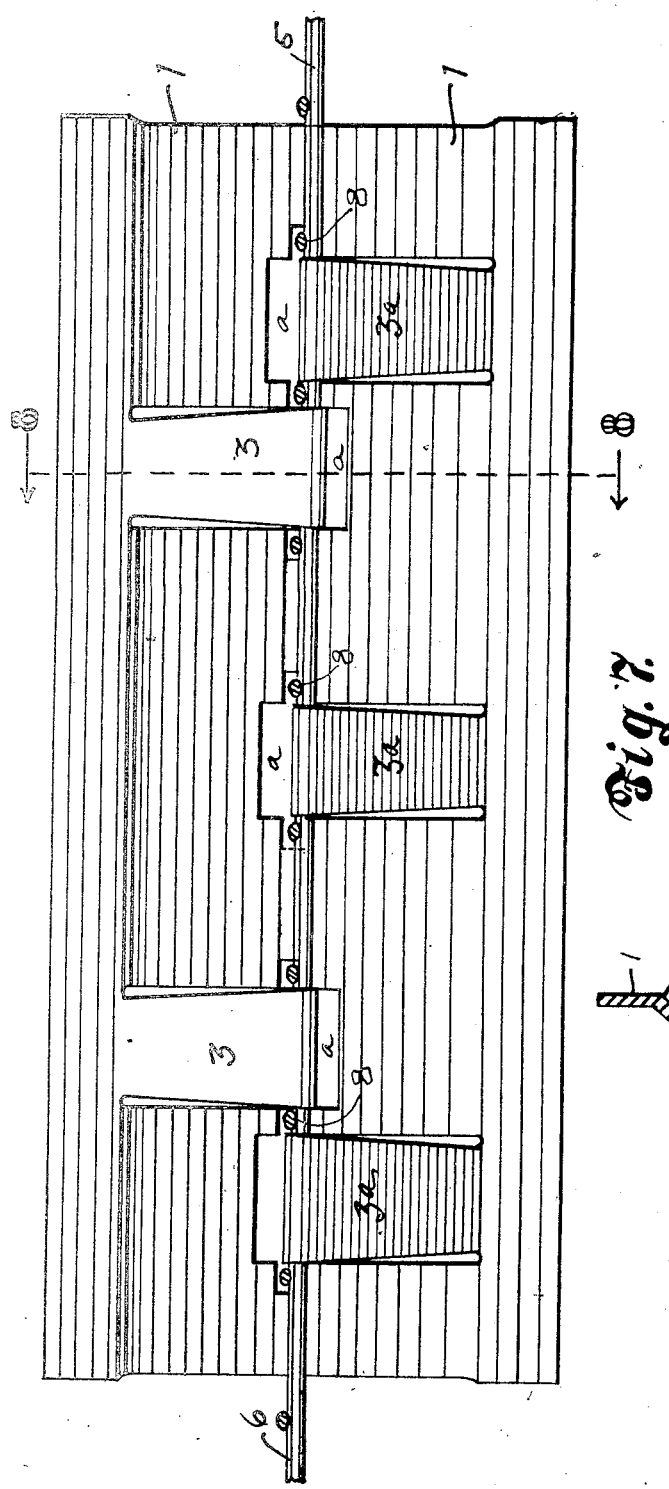
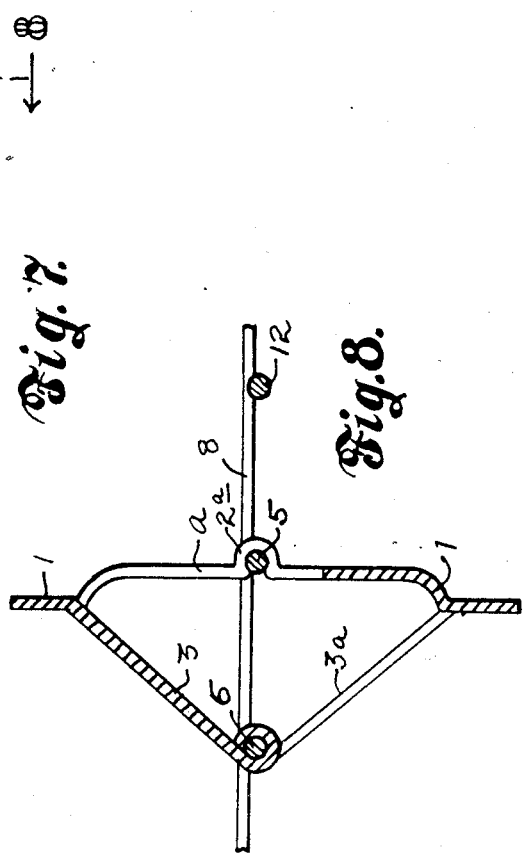
Peter J McInerney
INVENTOR Patented July 5, 1927.

1,634,263

UNITED STATES PATENT OFFICE.

PETER J. McINERNEY, OF DALLAS, TEXAS.

JOINT FORM.

Application filed June 9, 1925. Serial No. 35,860. REISSUED

This invention relates to a joint form for use in construction of concrete or other forms of matrices where a joint, parting line or partial parting line may be necessary or desired.

An object of the invention is to provide a form which may be used with continuous mat or mesh reinforcement without destroying any of the continuity of the reinforcement members and which will provide the joints or parting lines that may be necessary or desired.

Another object is to provide a device which may be attached to the mesh reinforcement, and swung or moved to the desired position on the reinforcement after the latter is placed, or may be made an integral part thereof when the reinforcement is fabricated, and placed in position with it.

Another object is to provide a form which will be rigidly self-sustained in position on the mesh without pins or legs being necessary.

A feature of the invention is the simplicity and economy in construction.

Other objects, advantages and features, as well as those already mentioned may be observed and noted in the course of the following detailed description, taken in connection with the annexed drawings in which:

Figure 7 is a front elevation of a form showing same above and below the reinforcement.

Figure 8 is a cross-section of Figure 7 taken on line 8—8.

Figure 1:
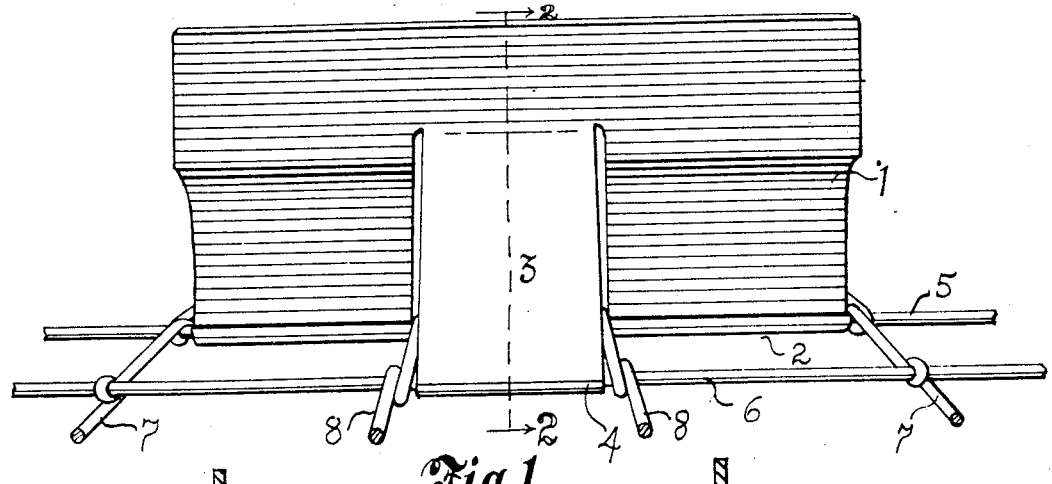
Figure 1 represents a perspective view of an embodiment of the invention in hinged attachment to the reinforcement mesh, and adapted to be raised and fixed in place after the reinforcement mesh has been placed.
Figure 2:
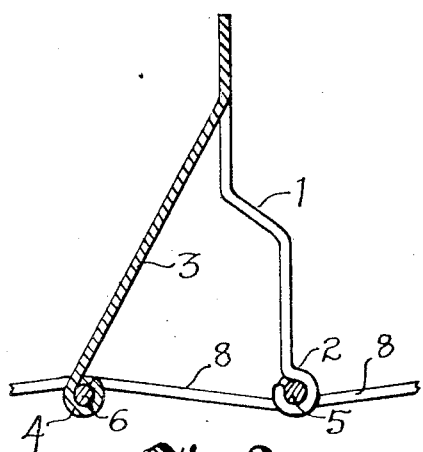
Figure 2 is a cross section of Figure 1, taken on lines 2—2.

In Figures 1 and 2, 1 represents the parting device or form, and 2 the hinge by which it is secured to the reinforcement mesh wire 5.

It will be noted that the body or plate forming the device may be made in curved or angular form to avoid slipping when the matrix has set. Also that these angles or curves may be varied in size and shape to best meet the conditions of use. The plate forming the device is cut to form tie 3, or a plurality of such ties at intervals along the plate. The tie thus formed is secured at its lower extremity to the reinforcement rod 6, by being bent around it at 4 and clamped or pressed thereon. It may readily be observed that the tie or ties will hold the parting plate or form in the desired position on the reinforcement in a substantial and rigid fashion.

In all the drawings the cross members of the reinforcement mesh are designated by the numerals 7 and 8. These cross members are secured to the reinforcement rods in the customary manner, not subject to any claim thereon in this specification.

Figure 3:
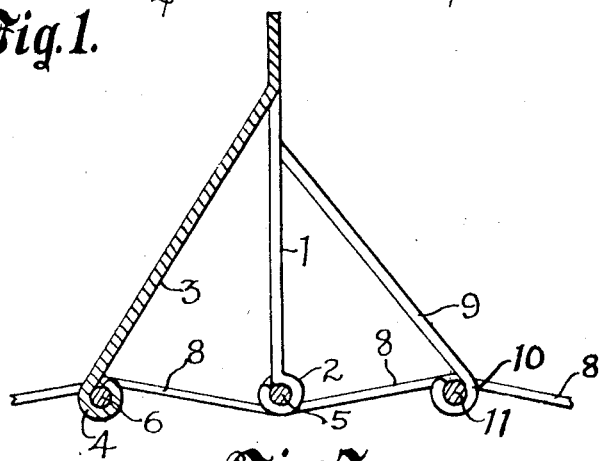
Figure 3 is a modification of the invention showing the tie and hinge supports on each side of the form.

In Figure 3 another tie 9 is shown which is bent at 10 around a third reinforcement rod 11, rods 5 and 6 being shown in the relative position as in the other figures. This figure shows how the double tie or support may be used, both ties being secured to the mesh rods after the parting device has been lifted into the desired position on the hinge 2.

Figure 4:
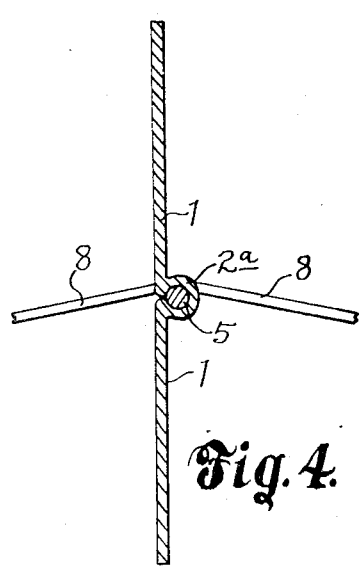
Figures 4, 5 and 6 are other modifications of the invention adapted to be welded or otherwise rigidly attached to the reinforcement when the latter is fabricated.

In Figure 4, the parting device is shown on both sides of the reinforcement mesh and is secured thereto by being shaped at 2ᵃ to engage the reinforcement rigidly and to maintain its relative position with respect thereto, in short, stationary.

Figure 5:
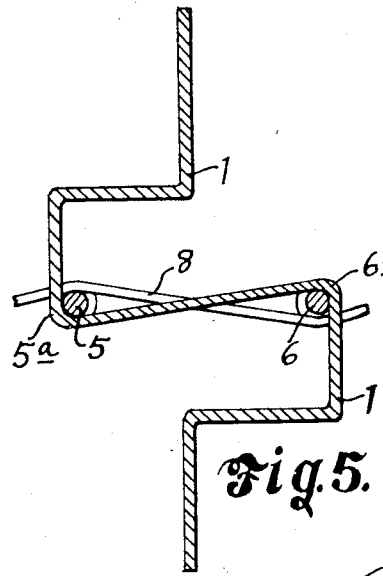

In Figure 5, the parting device is bent at 5ᵃ partially around, in fact, under the rod 5, and then extends to be bent over rod 6 at point 6ᵃ, and is then extended downward on the under side of the mesh.

Figure 6:
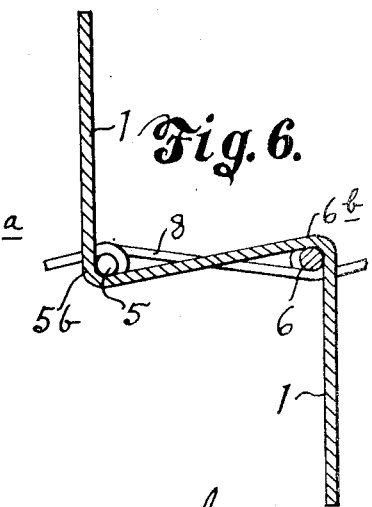

In Figure 6, the same principle is followed as in Figure 5, the plate being bent around the reinforcement at points 5ᵇ and 6ᵇ as shown.

In Figures 7 and 8, the form 1 is shown extending above and below the reinforcement, and it may as well extend on either or both sides when the reinforcement extends vertically or at an angle from the vertical. It will be noted in these figures, that the ties 3—3 above the reinforcement, and the ties 3ᵃ—3ᵃ below, are stamped or otherwise suitably formed from the plate, leaving the openings a—a in the plate. The plate may be formed with the reinforcement as an integral part thereof, or may be hinged to the reinforcement.

To clear the cross members 7 and 8 in any of the modifications shown, or in others that may be employed, the plate is notched or apertured where necessary to allow the passage of the reinforcement members therethrough, without destroying or changing the continuity of the members.

In operation, the device is secured in the desired position on the reinforcement mesh, either by the hinge means mentioned and described, by other similar means, or rigidly fabricated on the reinforcement, then the concrete or other matrix being poured, the joint form marks and determines the joints, parting lines, etc., in the matrix.

It should be fully understood that various changes as to size, angular form and length of the joint and its members may be made without departing from the spirit and intent of the following claims.

What I claim is:

1. In a device of the character described, a sheet of rigid material having a plurality of planes and curves and adapted to be attached to mesh reinforcement used in concrete or like construction, and means forming a part of said sheet in attachment to said mesh to rigidly maintain the attachment of the sheet and the mesh.

2. In a device of the character described, a plate of rigid material adapted to be secured by one or a plurality of hinges to the mesh reinforcement of concrete or other similar matrix construction, and means formed from the plate and extending therefrom to the reinforcement mesh, said means adapted to maintain the plate in rigid relationship to the reinforcement mesh.

3. In a joint form for concrete or similar construction having mesh reinforcement, a rigid plate member having a plurality of planes or curves therein means to secure said member to the mesh reinforcement employed in said construction, and means forming a part of said plate member to rigidly secure said member in desired position with respect to the reinforcement mesh.

In testimony whereof I have signed my name to this specification.

PETER J. McINERNEY.